Oct. 31, 1933.   A. Y. DODGE   1,932,884

BRAKE OPERATING MECHANISMS

Filed Nov. 3, 1930

INVENTOR.
ADIEL Y. DODGE
BY *M. W. McConkey*
ATTORNEY

Patented Oct. 31, 1933

1,932,884

UNITED STATES PATENT OFFICE 1,932,884

BRAKE-OPERATING MECHANISMS

Adiel Y. Dodge, South Bend, Ind., assignor to Bendix Brake Company, South Bend, Ind., a corporation of Illinois Application November 3, 1930. Serial No. 492,972

6 Claims. (Cl. 74—81)

This invention relates to brakes and is illustrated as embodied in novel brake applying means suitable for use on an automobile. An object of the invention is to provide simple and easily operated means for holding the brake applied when it is necessary to stop on a hill, while still leaving the driver's foot free to manipulate the accelerator pedal. This is especially desirable when it is necessary to stop for a traffic light on an up grade and where heretofore it has been necessary to hold the brakes with the hand lever to free the driver's right foot for manipulation of the accelerator pedal in starting up when the light changes.

Having this object in mind, in one desirable arrangement I provide means operated by the clutch pedal which holds the brake applied as described so that the driver can manipulate both the clutch and the brakes with his left foot, thereby leaving his right foot free for manipulation of the accelerator pedal. It should be noted that it is important to arrange the parts so that the brakes can be applied normally without affecting the clutch and I consider it very much preferable, although not essential, that the means operated by the clutch pedal should not necessarily apply the brakes when the clutch pedal is depressed.

Accordingly I show in the accompanying drawing two embodiments of the invention. In one of these, the clutch pedal, or its equivalent, operates in such a manner that when it is completely depressed, it actuates means which will hold the brakes applied, if at that time they are already applied, or if they are applied before the clutch pedal is released, whereas the ordinary manipulation of the clutch pedal to throw the clutch in and out does not in itself have any effect on the brakes. In this embodiment, it will be seen that the manipulation of the brake pedal is entirely independent of the clutch and has no effect on the clutch, although the brake pedal or its equivalent, is locked in its depressed position if it is in that position when the clutch pedal is completely depressed, or if the brake pedal is depressed during the time the clutch pedal is held down.

In the other, and in some respects simpler arrangement, which secures a number of the advantages of the invention, the clutch pedal merely has a one way operating connection with the brake mechanism so that while the brakes may be applied without affecting the clutch, the depression of the clutch pedal not only throws out the clutch, but also applies the brakes.

The above and other objects and features of the invention, including various novel and desirable structural features, will be apparent from the following description of the illustrative embodiments shown in the accompanying drawing, in which.

Figures 4, 5:
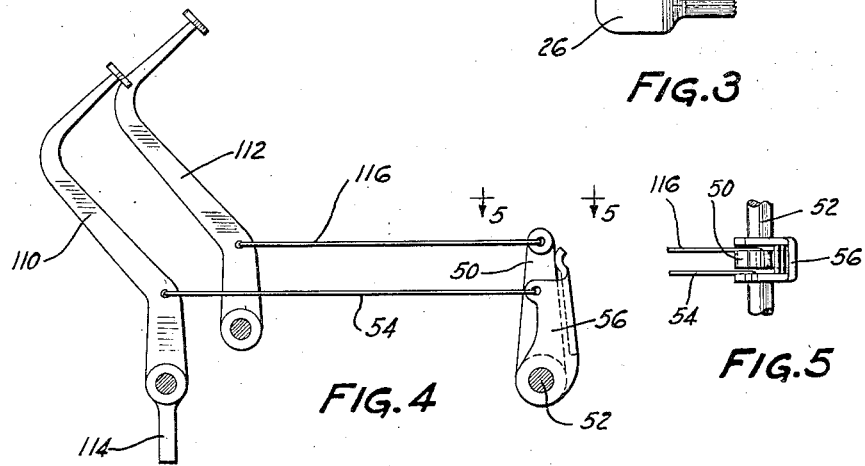

Figure 4 is a perspective view showing the clutch and brake pedals with a different means of connecting the clutch pedal to the brake mechanism; and Figure 5 is a plan view looking in the direction of the arrows 5—5 of Figure 4 and showing the connection between the clutch pedal and the brake mechanism.

Figures 1, 2:
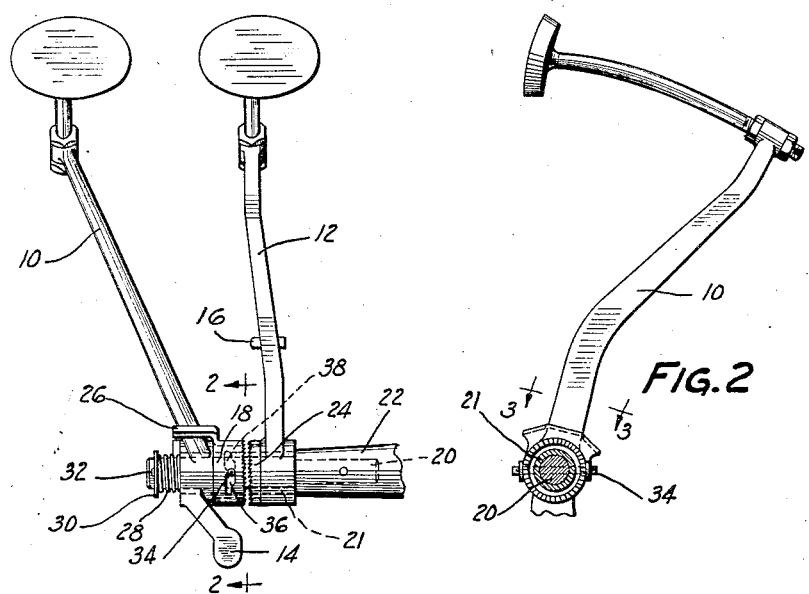
Figure 1 is a rear elevation of the clutch and brake pedals and their mounting.
Figure 2 is a section on the line 2—2 of Figure 1 showing the clutch pedal and the connecting member operated thereby in side elevation.
Figure 3:
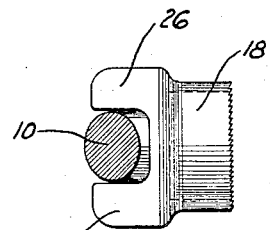
Figure 3 is a section on the line 3—3 of Figure 2 showing the relation of the clutch pedal and the connecting member.

In the arrangement of Figures 1 to 3, I have shown a clutch pedal 10 and a brake pedal 12, the clutch pedal having the usual extension 14 for throwing the clutch out against its clutch spring and the brake pedal having the usual brake rod connection 16 for operating the brake hookup. While it is customary to use clutch and brake pedals of the general type shown for operating the clutch and the brakes of an automobile, my invention does not have to do with the particular form of these operating parts and is equally applicable to equivalent operating means for the clutch and the brakes.

According to the present invention, the clutch pedal 10 is provided with means whereby when it is in its depressed position it may hold the brake pedal 12 to keep the brakes applied while the driver's right foot is shifted from the brake pedal to the accelerator pedal, in readiness for example for starting up smoothly and quickly when the traffic light changes from red to green.

The particular form shown in Figures 1 to 3 includes a sleeve 18 mounted on the shaft 20 projecting from the side of the transmission housing 22 and which may, if desired, have a bushing 21 of bearing material sleeved thereon, and on which the hubs of both of the levers 10 and 12 are sleeved. The sleeve 18 is formed on the side next the brake pedal with ratchet teeth facing in the direction to engage corresponding teeth formed on a part 24 formed integrally with or secured to the brake pedal 12, in such a manner that when the teeth of the parts 18 and 24 are in engagement, the brake pedal can be moved in the direction to apply the brakes, but cannot be moved in the opposite direction.

The sleeve 18 is formed with means such as a pair of arms 26 straddling the clutch pedal 10 in such a manner that the sleeve 18 turns with the clutch pedal, although, if preferred, the sleeve 18 may be formed as an integral part of the hub of the clutch pedal or be secured thereto in any other desired manner.

The clutch pedal 10, and with it the sleeve 18, are urged axially toward the brake pedal by means such as a spring 28 sleeved on the stationary stub shaft 20 and compressed between the hub of the clutch pedal 10 and a washer or other stop 30 held by means such as a cotter pin 32 on the end of the stationary shaft 20. Engagement of the ratchet teeth of member 18 with the ratchet teeth of member 24, except when the clutch pedal is completely depressed, is prevented by means such as a cam in the form of a transverse pin 34 extending through the fixed shaft 20 and having its opposite ends received in cam slots 36 and 38 formed on opposite sides of the sleeve 18. These slots are of such a form that when the clutch pedal is in its upper or released position, the member 18 and the hub of the clutch pedal 10 are forced to the left in Figure 1 to disengage the ratchet teeth on the member 18 from the ratchet teeth on the member 24. Near the end of the throw of the clutch pedal 10 the cam slots 36 and 38 are formed to permit the spring 28 to shift the clutch pedal and sleeve 18 axially to the right to cause engagement of these teeth.

In operation it will be seen that so long as the clutch pedal remains in its normal (clutch engaged) position it will have no effect upon the brake or the brake pedal but as soon as the clutch pedal is slightly depressed and the pin 34 enters the relatively wide portion of the slot 36 the spring 28 will be effective to move the hub of the clutch pedal and the sleeve 18 so that the ratchet teeth of the sleeve 18 engage with the ratchet teeth of the member 24. Therefore, throughout the intermediate range of movement of the clutch pedal 10 the teeth are engaged and movement of the clutch pedal serves to operate the brake pedal 12. If the clutch pedal is completely depressed the pin 34 moves into the narrow straight portion of the slot 36 and holds the teeth of the member 18 securely in engagement with the teeth of the member 24. Therefore, while the pin 34 is in the relatively wide portion of the slot 36, the brake pedal 12 may be independently applied further, the teeth of the member 24 sliding over the teeth of the sleeve 18 and compressing the spring 28, but after the pin 34 enters the narrow straight portion of the slot, the brake pedal 12 can neither be moved in nor out except simultaneously with a similar movement of the clutch pedal 10. Nevertheless, throughout movement of the clutch pedal corresponding to both the wide portion of the slot and the narrow portion thereof, force exerted upon the clutch pedal 10 is effective to operate the brake pedal 12 and throughout the movement corresponding to the wide portion of the slot and whenever the clutch is in its normal (clutch engaged) position, the brake pedal may be independently further applied without hindrance from the clutch pedal. Furthermore, when the clutch pedal is in the normal (clutch engaged) position such as is shown in Figure 1, the brake pedal 12 may be operated entirely independently of the clutch pedal both inwardly and outwardly throughout the length of movement of the brake pedal. Finally, when the clutch pedal has been moved only a short distance, the spring 28 moves the teeth into engagement so that if the brake has been previously applied or if the brake is thereafter subsequently applied, the clutch pedal becomes effective to hold the brake in its applied position through the teeth on the sleeve 18 and the brake pedal hub member 24 so long as the clutch pedal is maintained depressed.

If the driver desires to depress the clutch in coasting without engaging the brake, he presses upon the clutch pedal 10 only sufficiently to disengage the clutch and to move the teeth of the sleeve 18 into engagement with the teeth of the hub member 24. He does not press sufficiently to rotate the hub member 24 and to apply the brake. The only time in ordinary driving that it is really desirable to push the clutch pedal further in than just far enough to disengage the clutch is when the car is being brought to a stop. Under these circumstances, in my invention, the brake is applied. Moreover, as described above, my device permits the driver to hold both the clutch and the brake with his left foot thereby leaving his right foot free for manipulation of the accelerator pedal (as for example, while he is waiting for the light to change).

In the arrangement of Figures 4 and 5, I have shown a construction which in some ways is simpler than the one described above, although in my judgment it does not secure all of the advantages of the preferred construction. In this arrangement there is a clutch pedal 110 having a clutch operating arm 114 and a brake pedal 112 having a brake operating connection 116. The brake operating connection 116 extends to a lever 50 fixed on a brake operating shaft 52 arranged rearwardly of the two pedals.

The clutch pedal is provided also with a brake rod connection or the like 54 connected to a channel-shaped arm 56 loosely pivoted on the shaft 52 and embracing the arm 50 in such a manner that it forms a one way connection such that the arm 56 can operate the arm 50 while the arm 50 has no effect on the arm 56. In this arrangement the brake pedal 112 can be manipulated to operate the brakes without any effect on the clutch, whereas the manipulation of the clutch pedal 110 will apply the brakes automatically whether or not the brake pedal 112 is operated.

The parts may, of course, be so arranged that the throw of the various levers is such that the arm 114 will have thrown out the clutch either completely or so nearly as to leave a very slight drag before the arm 56 has moved the shaft 52 far enough to apply the brakes, at least far enough to have any substantial retarding effect on the vehicle. This gives the advantages of the system which was formerly quite common, in which the clutch pedal was connected to the emergency brakes, in that the brakes can be held with the left foot for the purposes described above, while at the same time it does not interfere with the ordinary manipulation of the brakes by means of the brake pedal 112.

While two illustrative embodiments of the invention have been described in detail, it is not my intention to limit its scope to those particular embodiments or otherwise than by the terms of the appended claims.

I claim:

1. Adjacently-mounted brake and clutch operating members having interengageable ratchet teeth, a spring urging the teeth into engagement, and means holding the teeth disengaged unless the clutch operating member has started its stroke.

2. Adjacently-mounted brake and clutch operating members having interengageable ratchet teeth, and a spring urging the teeth into engagement.

3. Adjacently-mounted brake and clutch operating members having interengageable parts so formed that the clutch member may operate the brake member but not vice versa, in combination with a spring urging said parts together, and a cam holding them apart until after the beginning of the stroke of the clutch operating member.

4. A pedal having a hub formed with ratchet teeth on one side and with a cam slot.

5. An attachment for use with a clutch operating shaft, a clutch operating pedal, and a brake operating pedal, comprising a sleeve formed with a plurality of ratchet teeth and with a cam slot.

6. In a vehicle; a shaft; a brake pedal mounted thereon; a clutch pedal mounted thereon provided with means for shifting the clutch pedal longitudinally of the shaft, said means comprising a sleeve having a yoke embracing a portion of said clutch pedal and formed with a cam slot, a pin secured to said shaft and passing through said cam slot, and a spring acting upon said clutch pedal; and means for causing engagement between said clutch pedal and said brake pedal.

ADIEL Y. DODGE.